Nov. 4, 1952      R. R. GRAVES      2,616,809
MILKING PROCESS

Filed May 16, 1949      6 Sheets-Sheet 1

INVENTOR:
Roy R. Graves,
BY
N. S. Amstutz
ATTORNEY

Nov. 4, 1952 — R. R. GRAVES — 2,616,809
MILKING PROCESS
Filed May 16, 1949 — 6 Sheets-Sheet 3

INVENTOR:
Roy R. Graves
BY
M. S. Amstutz
ATTORNEY

Patented Nov. 4, 1952

2,616,809

UNITED STATES PATENT OFFICE 2,616,809

MILKING PROCESS

Roy R. Graves, Valparaiso, Ind., assignor, by direct and mesne assignments, to The Graves-Stambaugh Corporation, a corporation of Delaware Application May 16, 1949, Serial No. 95,225

20 Claims. (Cl. 99—183)

This invention is directed to a method and apparatus for processing milk and this application is a continuation in part of my co-pending application Ser. No. 781,602 filed October 23, 1947.

The present day procedure in commercially handling and processing milk is quite standard. The cows are milked at each farm in the morning and at night, and the raw milk at each milking is promptly cooled from body temperature to 55° or 60° F. or lower. The night milking is usually stored at the lowered temperature over night and then it and the cooled morning milking are both delivered to a processing plant or to a station where it is reshipped to the processing plant. During the shipment of the milk to the shipping station there is normally a considerable rise in temperature which requires the milk to again be cooled before shipment to the processing plant and often it is again cooled at the processing plant so that it may be safely stored until it is processed. During the milking, cooling and storing at the farms, the shipping, and the cooling and storing at the processing plant, the raw milk is in contact with air, is subject to cooling and heating over relatively wide temperature ranges and is agitated considerably during handling all of which results in oxygen absorption and lypolytic action.

In the present day commercial processing of milk, the cooled stored raw milk received from the farms is first pasteurized by passing the raw milk through a pasteurizer which heats the milk to pasteurizing temperatures, various types of pasteurizers being used. The pasteurized milk is then cooled and bottled. If the milk is to be homogenized, it is passed through a homogenizer after it has been pasteurized. Here again, in the storing, pasteurizing, homogenizing, cooling and bottling steps, the milk is in contact with air and the milk tends to reach an oxygen equilibrium with that of the atmosphere.

Milk and cream commercially processed in the foregoing manner, while probably meeting sanitation requirements, definitely are lacking in certain qualities. Their flavor and palatability are considerably less than what they could be. Such milk and cream have "off flavors" such as rancid, tallowy, cardboardy, cowy and cooked or pasteurized flavors. They have a leucocyte sludge that necessitates clarification steps to remove it. There is a visible separation of cream layers after standing even when homogenized. When cream is placed in coffee feathering usually occurs because of its low heat stability. Acidity developes rapidly in such milk and cream turning the same sour rather quickly even under refrigeration. They have low heat stability and will tend to coagulate when exposed to high temperatures. They cannot be successfully canned for long time preservation. Vitamin C concentration is quickly lost.

Generally, these deficiencies in milk and cream commercially processed in the foregoing manner are brought about by absorption of oxygen by the milk during its cooling in the presence of air; by enzymic action instigated by cooling and warming before pasteurization; by bacterial action due to high bacterial content; by homogenization of the milk at high temperatures folowing pasteurization and by improper methods of pasteurization in which milk is exposed to high temperatures for considerable periods of time and without turbulence during the exposure.

The principal object of this invention is to provide an improved method and apparatus for processing milk wherein the resultant milk and cream have qualities heretofore unobtainable in pasteurized milk and cream, wherein "off flavors" such as rancid, tallowy, cowy and cooked or pasteurized flavors are substantially eliminated, wherein leucocyte sludge is substantially eliminated without clarification, wherein there is no visible separation of cream layers in homogenized milk even after long standing, wherein there is no feathering of cream when placed in coffee, wherein there is substantially no development of acidity over long periods of time, wherein the milk and cream will have high heat stability substantially to prevent coagulation and high viscosity when exposed to high temperatures, wherein milk and cream can be successfully canned for long time preservation either with or without refrigeration, and wherein the vitamin C concentration may be maintained over long periods of time.

The method of this invention for processing milk to produce the aforementioned advantageous results includes generally the steps of withdrawing from a cow raw milk aseptically and without contact with air, collecting the withdrawn raw milk without contact with air and maintaining the same at substantially body temperature, homogenizing the collected raw milk without substantial prior cooling and without contact with air, and promptly and rapidly heating the homogenized milk without contact with air at least to pasteurization temperatures. The pasteurized or heat treated milk may then be bottled or hermetically sealed in containers or further processed in any desired manner. When the homogenized milk is heated to sterilization temperatures it may be safety stored in hermetically sealed containers, such as cans, without refrigeration for substantially indefinite periods of time. In this respect the homogenized milk may be heated to sterilization temperatures before it is aseptically canned without contact with air or it may be heated to sterilization temperatures in the cans, the former being preferable.

By maintaining the raw milk out of contact with air and at substantially body temperature from the time it is withdrawn from the cow until it is heated at least to pasteurization temperatures, bacterial growth is substantially inhibited, oxidation is substantially prevented, the butterfat globules of the milk are kept in liquid form and enzymatic reaction of lipase is held to a minimum. These factors are of prime importance in the production of milk and cream having the aforementioned desirable and advantageous qualities.

It is found that there is substantially no bacterial growth in the raw milk kept at substantially body temperature and out of contact with air for a period of three hours or so, and that the becteria count of milk processed in accordance with his invention is considerably less than that of milk processed in accordance with present day commercial practices. Keeping the raw milk out of contact with air also prevents contamination by air borne bacteria and further prevents absorption of oxygen and hence oxidation of the milk. The prevention of oxygen absorption of the raw milk, and of the milk in subsequent processing, prevents oxidation changes in the milk and its constituents that lead to lowered heat stability and to the development of undesirable flavors.

Because the raw milk is maintained at substantially body temperature out of contact with air before heating at least to pasteurization temperatures, the butterfat globules remain liquid instead of becoming solid or clumped as in present day practice where the raw milk is substantially cooled before pasteurization. This is one of the factors which maintains the enzymatic action of lipase at a minimum to provide a pasteurized milk which may be safely stored over long periods of time, which prevents the formation of "off flavors" such as rancid and tallowy, which permits thorough pasteurization of the milk, which provides the milk with heat stability, and which permits more thorough homogenization without the formation of leucocyte sludge or sediment. Because oxidation and acidification of the milk processed in accordance with this invention are retarded or inhibited, the vitamin C concentration is maintained over long periods of time.

There are at least four grades of milk that may be produced by the method and apparatus of this invention, the differences being due to the degree of heat treatment applied and the method of packaging. In all instances, however, the method and apparatus for aseptically withdrawing the milk from the herd, handling, homogenizing and pasteurizing or sterilizing are the same.

In the first grade of milk and cream, A class, it will be homogenized and pasteurized at 161° F. and packaged in glass or paper cartons in the presence of air. Kept under refrigeration and without undue exposure to light this milk and cream have the following characteristics that distinguish them from other milks and creams; they have so little pasteurization flavor that many believe them to be raw milk and cream; they have no leucocyte sludge even without clarification; they have no visible separation of cream layers even after long standing; they have a high heat stability and do not feather in coffee; they do not develop rancid, tallowy or cowy flavors; and there is no development of acidity for a period of more than two weeks when kept under refrigeration.

The next grade is a super-pasteurized milk or cream that is homogenized and pasteurized at 190° F. or above and packaged in glass or in tin either in a vacuum or in an inert gas such as nitrogen or carbon dioxide. When packed in gas they are processed and packaged under positive gas pressure and they are discharged into the filling chamber of the packaging machine while still warm in order to effect a still further reduction in the oxygen content. Kept under refrigeration and without undue exposure to light they will have substantially the characteristics of the first grade of milk. Further, they will keep for periods of from two to four weeks without developing rancid, tallowy or cowy flavors or without development of acidity.

The third grade is a sterile milk or cream that is homogenized and packaged in tin either in a vacuum or in an inert gas. They are processed in the same manner as the super-pasteurized milk and cream except that they are packaged in tins, and therefore, are not exposed to light. Furthermore, the milk is raised to sterilization temperature, either before the milk is aseptically placed in the tins or after it is sealed in the tins. The characteristics of this milk and cream are substantially the same as those of the other grades. In addition, however, this milk and cream can be kept for indefinite periods without refrigeration and will not develop rancid, tallowy or cowy flavors even though no preservative, stabilizer or antioxidant has been added.

The fourth grade is a milk and cream processed for manufacturing purposes and the same process is utilized as in the super-pasteurized grade. It may or may not be homogenized depending upon the product to be made. It has the same general qualities as discussed above. Because of its extremely low oxygen content and absence of lipolytic action this milk is ideal for the manufacture of dried whole milk or dried cream where great difficulties have been experienced in the development of rancid or oxidized flavors in the finished product. It is also ideal for the manufacture of special baby foods because of its low bacterial content and soft curd. Because it has not had its physical character altered by enzymatic action due to the cooling and warming of the fat globules, it, therefore, possesses all the natural flavors and is ideal for the manufacture of any dairy product where excellence of flavor is essential.

Further objects of this invention reside in the specific steps of the method and the relationship between such steps, and also, in the construction of the apparatus for performing the method of this invention including the details of construction and the cooperative relationship between the component parts of the apparatus.

Other objects and advantages will become apparent to those skilled in the art upon reference to the accompanying specification, claims and drawings in which:

Figure 1:
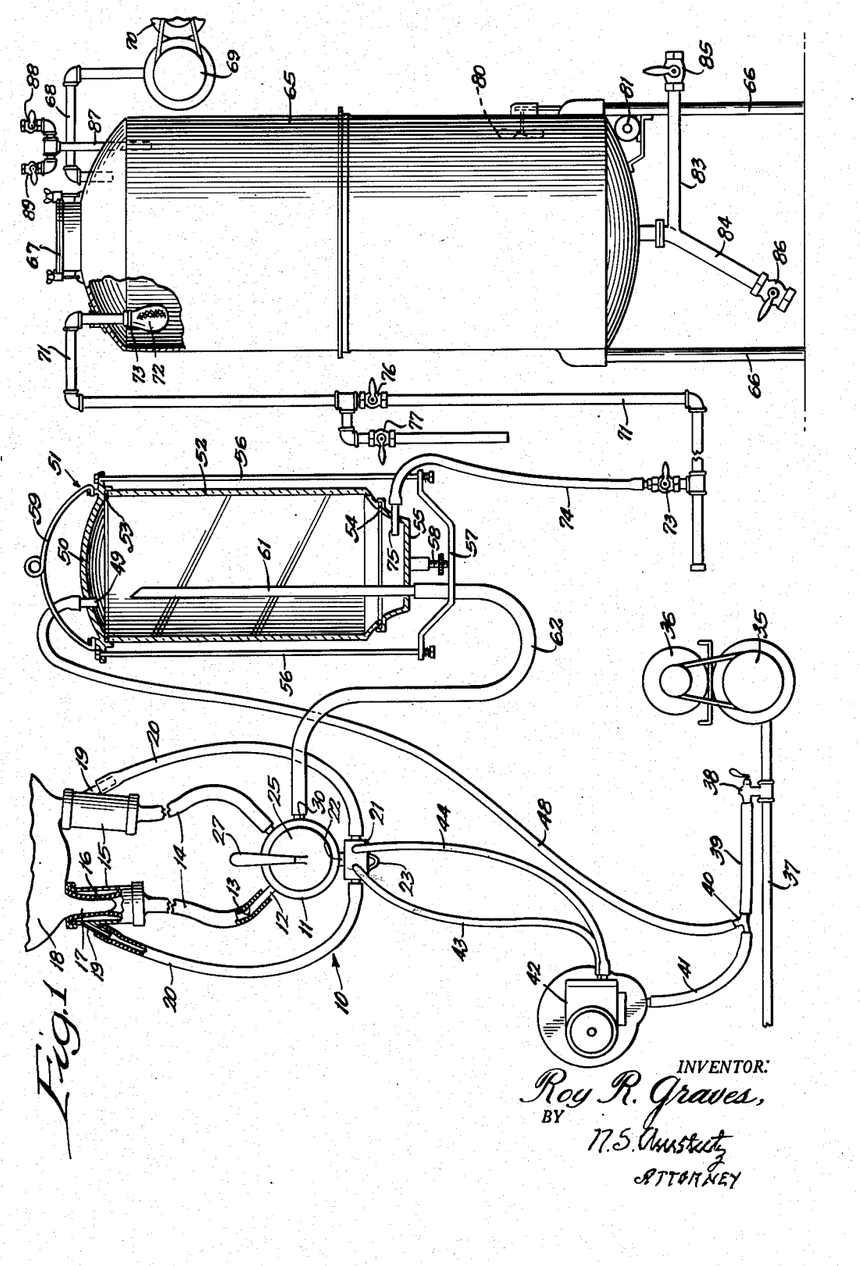
Figure 1 is a diagrammatic view illustrating a milking machine, weigh jar and receiving tank operatively associated for performing the first portion of the method of this invention.

In my co-pending application Ser. No. 781,602 of which this application is a continuation in part, there is illustrated a milking parlor in which four cows may be milked at a time, utilizing four milking machines. Fig. 1 of this application merely illustrates one milking machine, one weigh par and one receiving tank, and it is contemplated herein that any number of milking machines and weigh jars may be utilized, such as the four milking machines and weigh jars of said co-pending application.

Figures 7, 8, 10:
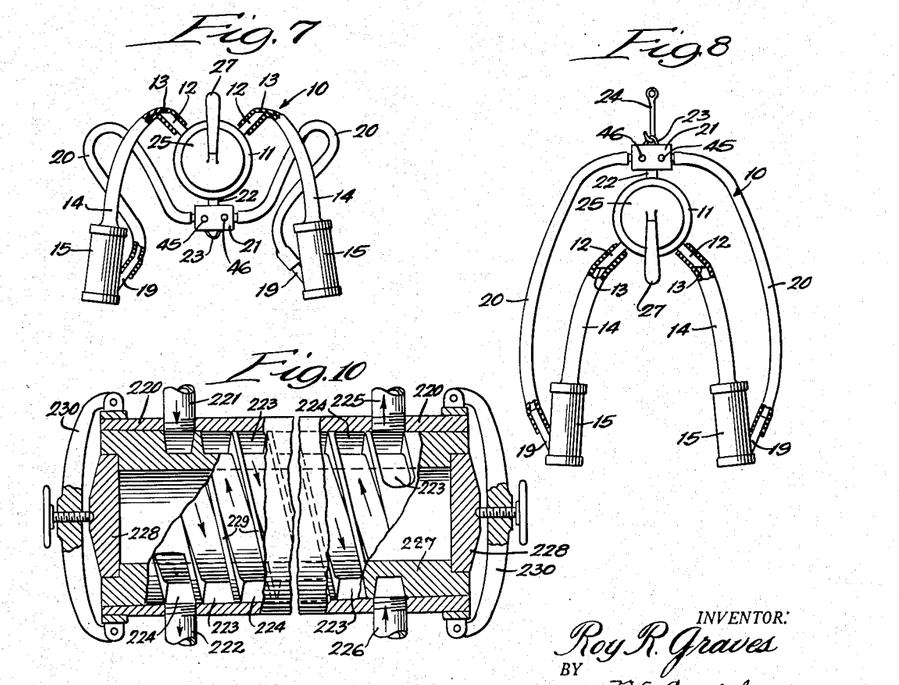
Figures 7 and 8 are illustrations of the claw and teat cups of the milking machine shown to be located in different positions.
Figure 10 is an elevation of a regenerator.

Referring specifically to Figures 1, 5, 7 and 8 the milking machine is generally designated at 10. It includes a claw having a manifold 11 provided with four nipples 12, each having an angular end 13. Each nipple is connected by a rubber tube 14 to the metal shell of a teat cup 15 which is internally provided with a rubber sleeve 16 adapted intermittently to compress the teat 17 of the cow's udder 18. The metal shell 15 of each teat cup is provided with a nipple 19, each of which are connected by rubber tubes 20 to a manifold 21 secured at 22 to the manifold 11. The manifold 21 is provided with an eye 23 so that the claw may be suspended by a hook 24 received in the eye 23 as illustrated in Fig. 8.

Figures 4, 5:
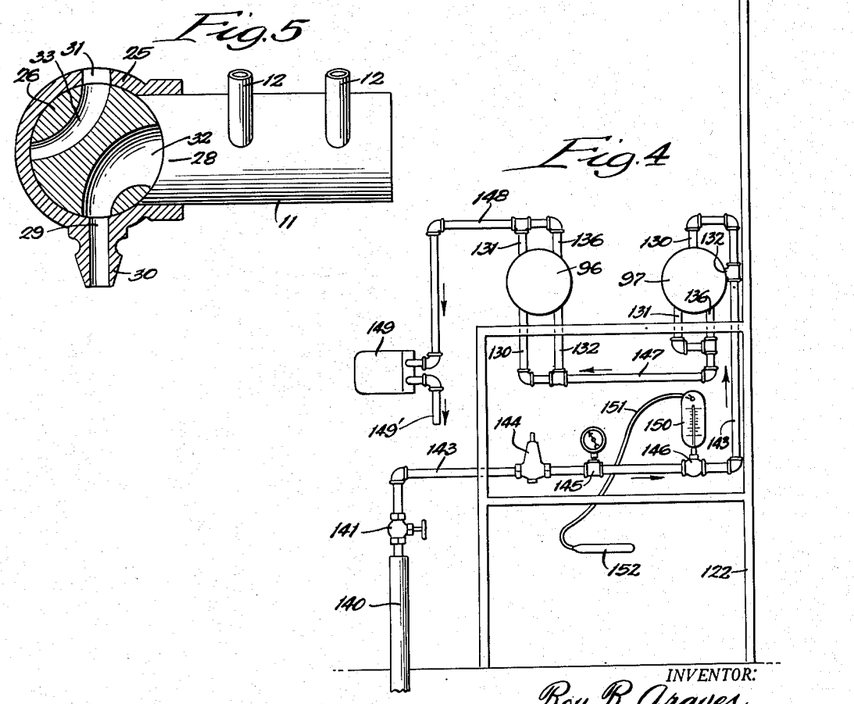
Figure 4 is a diagrammatic illustration of the pre-heater and pasteurizer showing the manner in which the same are supplied with steam.
Figure 5 is a detail view of a valve incorporated in the milking machine.

The manifold 11 is provided with a valve casing 25 for receiving a valve 26 operated by a handle 27, as is clearly illustrated in Fig. 5. The valve casing 25 opens into the manifold 11 at 28 and is provided with a suction opening 29 communicating with a fitting 30. The valve casing 25 is also provided with a vent port 31. The plug 26 has a milk passage 32 which connects the manifold 11 with the fitting 30 when the valve plug is in the position illustrated in Fig. 5. When, however, the valve plug is rotated clockwise through a quarter of a turn the communication between the manifold 11 and the fitting 30 is broken, the fitting is sealed off and communication is established between the manifold 11 and the vent port 31 by the passage 33. Valve 26 may be located any place in line 62 intermediate the manifold 11 and weigh jar 51, but in that case manifold 11 would have a hose fitting at the end where valve 26 is attached and valve 26 would require an additional hose fitting at 32; or if more convenient for operation valve 26 may be attached to the weigh jar at the point where 62 and 61 join. In any of these three locations valve 26 accomplishes the same purpose, that is, it breaks the vacuum in manifold 11, tubes 14, and inner liner 16, permitting the teat cups to drop off the teats without admitting air to the weigh jar 51, at the end of the milking operation.

A vacuum pump 35 driven by a motor 36 is connected to a vacuum line 37 which in turn may be connected to all of the milking machines and weigh jars utilized. The vacuum line 37 is associated with the milking machine 10 through a valve 38. The valve is connected by a rubber tubing 39 to a T fitting 40 which in turn is connected by a tube 41 to a pulsator 42. The pulsator 42 is connected by tubes 43 and 44 to nipples 45 and 46, respectively, communicating with the manifold 21 of the milking machine. The pulsator 42 operates intermittently to place vacuum on the tube 43 and atmospheric pressure on the tube 44 alternately. Thus, the pressure in the manifold 21 is alternately changed from vacuum to atmospheric pressure to expand and contract the rubber sleeves 16 of the teat cups to produce the milking action.

The other leg of the T fitting 40 is connected by a tube 48 to a nipple 49 secured in the cover 50 of the weigh jar 51. The weigh jar includes a transparent bottle 52 sealed to the cover 50 by a gasket 53 and to a base 55 by a gasket 54. Tie rods 56, a frame 57 and an adjusting screw 58 maintain the cover 50, the weigh jar 52 and base 55 in assembled and sealed relation. The weigh jar 51 may be supported on a suitable scale by a bail 59. The base 55 carries a tube 61 which is connected by a tube 62 to the fitting 30 of the claw of the milking machine.

Thus, the vacuum pump 35 produces a vacuum in the weigh jar 51 and through the tubes 61 and 62 produces a vacuum in the manifold 11 which is communicated to the interior of the teat cups by the tubes 14. As the cow is milked by the action of the pulsator 42 the milk is drawn by vacuum from the teat cups through the manifold 11 and tubes 61 and 62 into the weigh jar 51. Preferably, the vacuum utilized for this purpose may be at any point in the range between 10 and 15 inches, though it is important that the same degree of vacuum be utilized at all milkings. In this way the milk is withdrawn from the cow aseptically and without contact with air. It will be understood that the rubber liner 16 hugs the base of the teat so tightly during the milking operations that the amount of air admitted around the teat during the milking is infinitesimal and, any air that might thus be admitted is promptly sucked out by the action of the vacuum.

When the milking of the cow is completed the valve plug 26 is rotated through one quarter of a turn whereby the vacuum connection between the claw of the milking machine and the weigh jar is closed off so that the vacuum is retained in the weigh jar. At the same time the teat cups are vented to atmosphere so that they may be removed from the cow. The milking machine is then hung in the inverted position as illustrated in Fig. 8 and may be cleaned with water and a suitable antiseptic before it is attached to the next cow to be milked.

When the next cow is to be milked, the milking machine is rotated from the inverted position to the normal position as illustrated in Fig. 7 with the teat cups hanging downwardly as is shown. The rubber tubes 14 then overlie the angular ends of the nipples 12 and act as a valve means for sealing off the nipples. The valve plug is then rotated to the position illustrated in Fig. 5 to establish the vacuum in the manifold 11. This vacuum will not be broken because of the valve action of the ends of the nipples 12. As each teat cup is elevated and placed upon the cow, the respective tubes 14 uncover the ends of the nipples 12 so that the vacuum in the manifold 11 is individually communicated with each teat cup as it is applied to the cow. In this way an effective vacuum seal is provided to prevent breaking of the vacuum in the weigh jar at the beginning of each milking operation. This keeps the milk out of contact with air since it is drawn from the teat into a vacuum that exists throughout its passage from the liner 16 to the weigh jar 51 and from the weigh jar 51 into the vacuum tank 65. Of course, the milk is withdrawn from the weigh jar 51 between each milking operation.

A receiving tank 65 is adapted to receive milk from the various weigh jars. It may be supported by suitable legs 66. The top of the receiving tank may be provided with a suitable manhole 67 which is normally sealed shut, but which may be opened for the purpose of cleaning the interior of the tank 65. A vacuum is produced in the tank 65 by a vacuum connection 68 leading from a vacuum pump 69 driven by a suitable motor 70. A vacuum may be maintained in this tank by means of a steam jet vacuum apparatus, if so desired. Preferably, the vacuum retained in the tank 65 is between 20 and 25 in., there thus being a differential in vacuum between the tank 65 and the weigh jar 51. A milk line 71 enters the top of the tank 65 and may be provided with a suitable strainer 72 held in place by a ring 73. It is found that a flannel sock with the nap on the inside is a very effective strainer and successfully strains all foreign matter which might be present in the milk such as scurf from the exterior of the teats and the like. The milk line 71 is connected through a valve 73 and a tube 74 to a nipple 75 entering the bottom of the weigh jar 51. Thus, when the valve 73 is opened milk is withdrawn from the weigh jar 51 into the receiving tank 65 by reason of the differential in vacuum existing therebetween. It is, therefore, not necessary to break the vacuum in the weigh jar to withdraw milk therefrom into the receiving tank. In this way the milk is kept out of contact with air.

While the milk may be withdrawn directly from the milking machine 10 into the receiving tank 65, it is desirable to interpose the weigh jar 51. By reason of the weigh jar 51 it is possible to weigh the milking of each cow in order to keep accurate records of milk production and the weigh jar also provides a ready means for inspecting the milking of each cow before the same is joined with the milkings of other cows in the receiving tank. For example, if a blood vessel in the udder of a cow were ruptured so as to discolor the milk from that cow, it would be readily detected in the weigh jar and would not be transmitted to the receiving tank. In this way discoloration of the entire milking of the herd is effectively prevented.

In the event that it is desired to withdraw and dispose of the milking in the weigh jar 51 the vacuum in the weigh jar may be broken by closing valve 38 and removing the teat cups from the cow in the manner mentioned above by rotating the valve plug 26 and then rotating the valve plug (Fig. 5) an additional quarter revolution so that the passage 33 establishes communication between the manifold 11 and the fitting 30. Thus, air may enter the weigh jar through the teat cups, the manifold and tubes 62 and 61 because the teat cups are not on the cow. The tube 74 is then disconnected from the valve 73 and the milk drained from the weigh jar therethrough. The tube 74 may then be replaced on the valve 73 and the weigh jar 51 may be washed and rinsed with water and a chlorine solution by placing the teat cups in a pail of water and chlorine solution and establishing the vacuum connection between the teat cups and the weigh jar. After the weigh jar has been rinsed and filled with water and chlorine, it may be drained from the weigh jar in the same manner that the discolored milk was drained therefrom.

If it is desired to take milk or cream that is to be processed into tank 65, suitable connections can be made to the receptacle in which they are contained, through valve 77. When valve 76 is closed and 77 is opened, the milk or cream will be drawn into tank 65 by the vacuum therein. An inert gas may be sucked into tank 65 through valve 77, to blanket the milk or cream it contains and prevent contact with air after the vacuum in tank 65 is broken.

The receiving tank 65 may be provided with a suitable agitator 80 driven by a motor 81 for keeping the milk in the receiving tank in motion to prevent formation of cream layers. Milk may be withdrawn from the receiving tank 65 through connections 83 and 84 controlled by valves 85 and 86 respectively. The connection 83 may lead to the homogenizing and pasteurizing apparatus illustrated in Figs. 2 and 9, and connection 84 may lead to some other processing equipment if different processing is desired.

The receiving tank may be cleaned and sterilized by inserting water and steam therein through a pipe 87 connected to valves 88 and 89 controlling the supply of water and steam, respectively. To clean and sterilize the milk line 71 and the weigh jar, valve 76 in the milk line may be opened and valve 77 may be closed. In this way steam admitted to tank 65 through valve 89 will flow through pipe 71 and tubes 74 into the weigh jars.

The milk received in the receiving tank 65 will be at substantially body temperature and it is found that there is little drop in temperature even though milk is retained therein for two or three hours. If, however, it is desired to maintain the milk exactly at body temperature the receiving tank may be suitably jacketed for the reception of warm water for this purpose.

Figure 2:
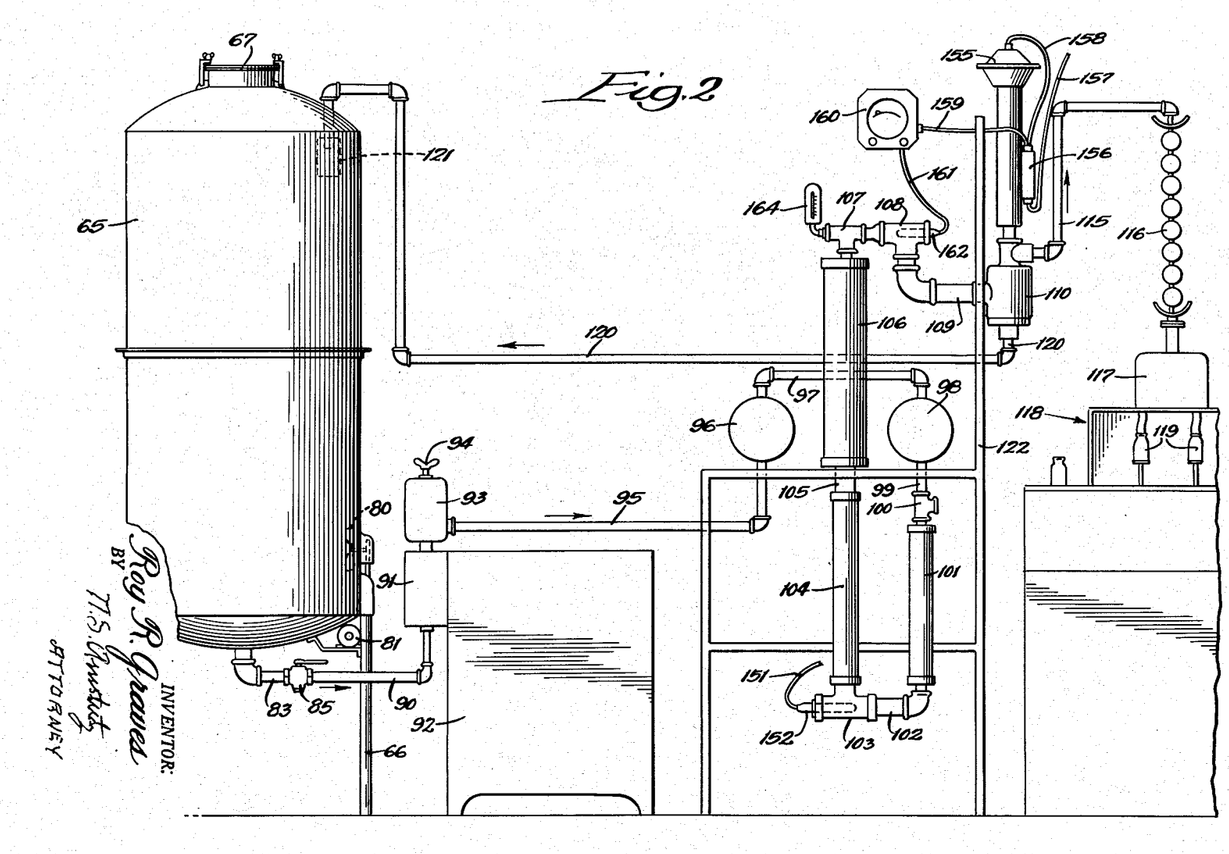
Figure 2 is a diagrammatic illustration of a receiving tank, homogenizer and pasteurizer, and the cooperative relationship therebetween for performing another portion of the method of this invention.
Figure 3:
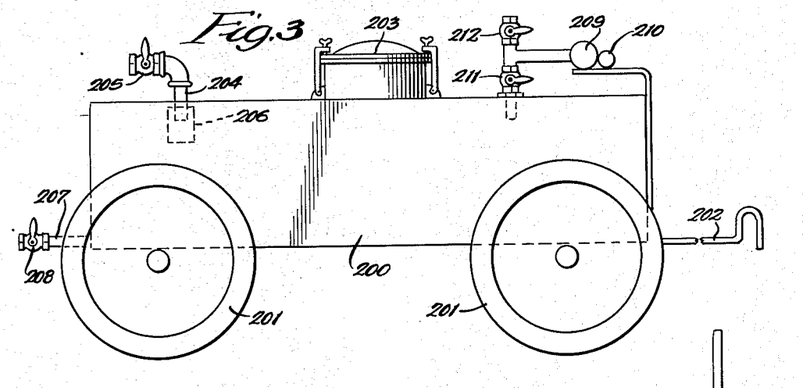
Figure 3 is a diagrammatic view of a portable receiving tank which may be utilized in the method of this invention.

Fig. 2 illustrates an apparatus wherein the raw milk at substantially body temperature and without contact with air may be homogenized, pasteurized, cooled and bottled to provide grade A milk as discussed above. The receiving tank 65 in Fig. 2 may be the same tank as the receiving tank 65 of Fig. 1 if the entire milk process is carried on at the dairy farm. If, however, the homogenzation, pasteurization, etc. is to be carried on at a point remote from the dairy farm, then of course, the receiving tank 65 of Fig. 1, will be portable as shown in Fig. 3, and will receive the milk directly from the weigh jars, and at the completion of the milking will be taken to a central processing plant where the milk it contains will be drawn into a vacuum weigh tank and then into a stationary vacuum tank 65 in the processing plant.

Raw milk at substantially body temperature and out of contact with air is withdrawn from the receiving tank 65 through connection 83, valve 85, pipe 90 and the inlet 91 of a conventional homogenizer 92. After the milk is homogenized in the homogenizer 92 it is discharged through the outlet connection 93 into pipe 95. The adjusting handle 94 may be utilized for adjusting the homogenizing pressure and it is found that the raw milk is thoroughly homogenized at a pressure of about 2,000 lbs. per square inch. The homogenizer 92, therefore, operates to withdraw the raw milk from the receiving tank 65 without contact with air, homogenize the same and deliver the homogenized raw milk to the pipe 95. The homogenized milk then traverses a pre-heater 96 and is conveyed by a pipe 97 to a heater or pasteurizer 98 where the homogenized milk is heated at least to pasteurization temperatures. From the heater or pasteurizer 98 the pasteurized milk passes through a pipe 99 and T fitting 100 to a holding valve consisting of pipe 101, 102, well fitting 103 and pipes 104, 105 and 106. The size, diameter and lengths of the pipes of the holding valve are such that it takes at least 15 seconds for the homogenized, pasteurized milk to pass therethrough. The pasteurized milk is then conveyed from the holding valve through the well fittings 107 and 108 and pipe 109 to a diversion valve 110. The diversion valve operates automatically to direct the flow of milk to a conduit 115 or to a conduit 120. The conduit 115 conveys the milk to a conventional milk cooler such as an aerator cooler 116 and the cooled milk then enters the milk feed chamber 117 of a conventional bottle filling and capping machine 118 for filling bottles or containers 119.

The other conduit 120 operates to convey the milk back to the receiving chamber 65 in the event that the milk is not properly pasteurized. The end of the conduit 120 in the receiving tank 65 may be provided with a suitable strainer like the strainer 72 described above.

The pre-heater, pasteurizer, holding valve and diversion valve may be suitably supported by a supporting frame 122 which is preferably of open construction so that free access to all of the devices carried thereby may be had.

Figure 6:
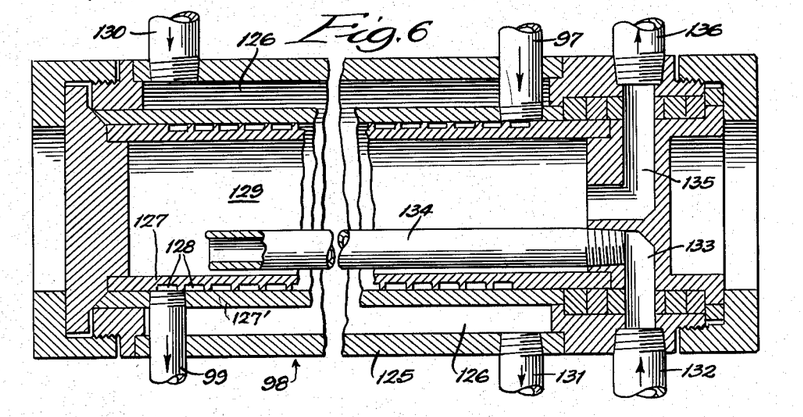
Figure 6 is a vertical sectional view through the pasteurizer.

The heater or pasteurizer 98 may be of the construction disclosed and claimed in my co-pending application Ser. No. 742,673 filed April 19, 1947 and which is illustrated in Fig. 6 hereof. It includes an outer casing 125 having a steam jacket 126 and an inner sleeve welded into the outer casing. A tapered core 127 with an internal steam jacket 129 and provided with exterior helical grooves 128, fits the sleeve 127'. The milk to be pasteurized enters the pasteurizer through the pipe 97 and flows along the helical grooves 128 by the pumping action of the homogenizer 92 and is pasteurized by the steam present in the steam chambers 126 and 129. Steam enters the chamber 126 through pipe 130 and discharges therefrom through pipe 131. Steam also enters into the chamber 129 through pipe 132, passage 133 and pipe 134, and is discharged therefrom through passage 135 and pipe 136. By reason of the construction of this pasteurizer the milk is brought quickly up to pasteurizing temperature and as it passes through the pasteurizer it does so at high velocity with considerable centrifugal force imparted thereto. This fast moving milk with the forces imparted thereto operates to keep the fat globules thoroughly in suspension, a secondary homogenization action at low pressure; and the high degree of turbulence in the milk or cream passing through the spiral groove at high velocity and with centrifugal action, effectively prevents "burning on" of the milk. This is one of the factors which provides the milk with high heat stability and at the same time prevents the formation of pasteurized or cooked flavors. The pre-heater 96 may be of the same construction as the pasteurizer and may operate in the same manner. The pre-heater will raise the temperature of the raw homogenized milk up to about 130° whereupon the milk is raised from that temperature to the pasteurizing temperature of at least 160° F. by the pasteurizer.

The manner of supplying steam to the pasteurizer and pre-heater is illustrated in Fig. 4. Here the steam is supplied from the steam header 140 through valve 141 and pipe 143 containing a pressure reducing valve 144, a pressure gauge 145 and a thermostatically operated valve 146. The steam from the pipe 143 enters the heater or pasteurizer 98 through pipes 132 and 130 and is exhausted therefrom through pipes 131 and 136 to pipe 147. The exhaust steam in pipe 147 from the pasteurizer 97 then flows through pipes 130 and 132 into the pre-heater 96 and exhausts therefrom through pipes 131 and 136 into pipe 148 and thence through a steam trap 149 to the exhaust steam header 149'. Thus the live steam regulated as to pressures and flow first enters the pasteurizer for pasteurizing purposes and then the exhaust steam from the pasteurizer enters the pre-heater for pre-heating purposes. Thus, economy of steam is provided in bringing the milk up to pasteurizing temperatures.

The amount of steam supplied to the heater or pasteurizer and hence the pre-heater is regulated by a thermostatic device 150 operating the valve 146. This thermostatic device includes a capillary tube and a thermometer bulb 152 which is located in the well fitting 103 of the holding valve. Thus, the temperature of the milk in the holding valve regulates the steam supply so that the temperature in the holding valve is maintained at pasteurizing values, for example, at least 160° F.

Referring again to Fig. 2, the diversion valve 110 is operated by an air motor 155 which in turn is controlled by a solenoid valve 156. The solenoid valve controls the supply of air from an air supply pipe 157 to a control pipe 158 connecting the solenoid valve with the air motor. When the solenoid valve is energized, air is supplied to the air motor 155 to maintain the diversion valve 110 in a lowered position whereby the milk from the holding valve is conveyed through the milk conduit 115. The solenoid valve 156 is suitably electrically connected by wires 159 to a control switch in a conventional thermometer controller 160 having a capillary tube 161 connected to a thermometer bulb 162 located in the well fitting 108.

So long as the temperature of the milk flowing from the holding valve through the well fitting 108 is at or above pasteurization temperature, the thermometer controller 160 maintains the solenoid valve 156 energized to direct the flow of pasteurized milk through the milk conduit 115. If, however, the temperature of the milk at the well fitting 108 should decrease below pasteurization temperature, then the solenoid valve 156 is de-energized by the thermometer controller 160 whereupon the air motor 155 is operated to move the diversion valve 110 upwardly. As a result, the milk from the holding valve is diverted through the pipe 120 back into the receiving tank 65. This diversion back to the receiving tank 65 will continue until the temperature of the milk at the well fitting 108 returns to the pasteurizing temperature of at least 160° F. When the pasteurizing temperature is again obtained, the diversion valve 110 will be operated under the control of the thermometer controller 160 to direct the pasteurized milk through the milk conduit 115. By reason of this thermostatically controlled diversion valve and the holding valve, pasteurization of the milk at pasteurization temperatures for at least 15 seconds is assured.

In order to test the operation of the holding valve and the diversion valve, cool milk may be inserted in the T fitting 100 to lower the temperature of the milk in the holding valve. This lower temperature should cause operation of the thermometer controller to divert the pasteurized milk back to the receiving tank 65. Thus, a simple method of checking the operation of the holding valve and the diversion valve is provided. The thermometer controller is preferably of the recording type so that an accurate record may be kept of the pasteurization process. A thermometer 164 may be contained within the well fitting 107 for giving a visible indication of the pasteurizing temperature.

While the apparatus of Fig. 2 has been explained in connection with a pasteurizing temperature of 160° F. obviously it may operate at higher pasteurizing temperatures, for example, at 190° F., in order to provide super-pasteurized milk having high heat stability and other qualities discussed above.

Figure 9:
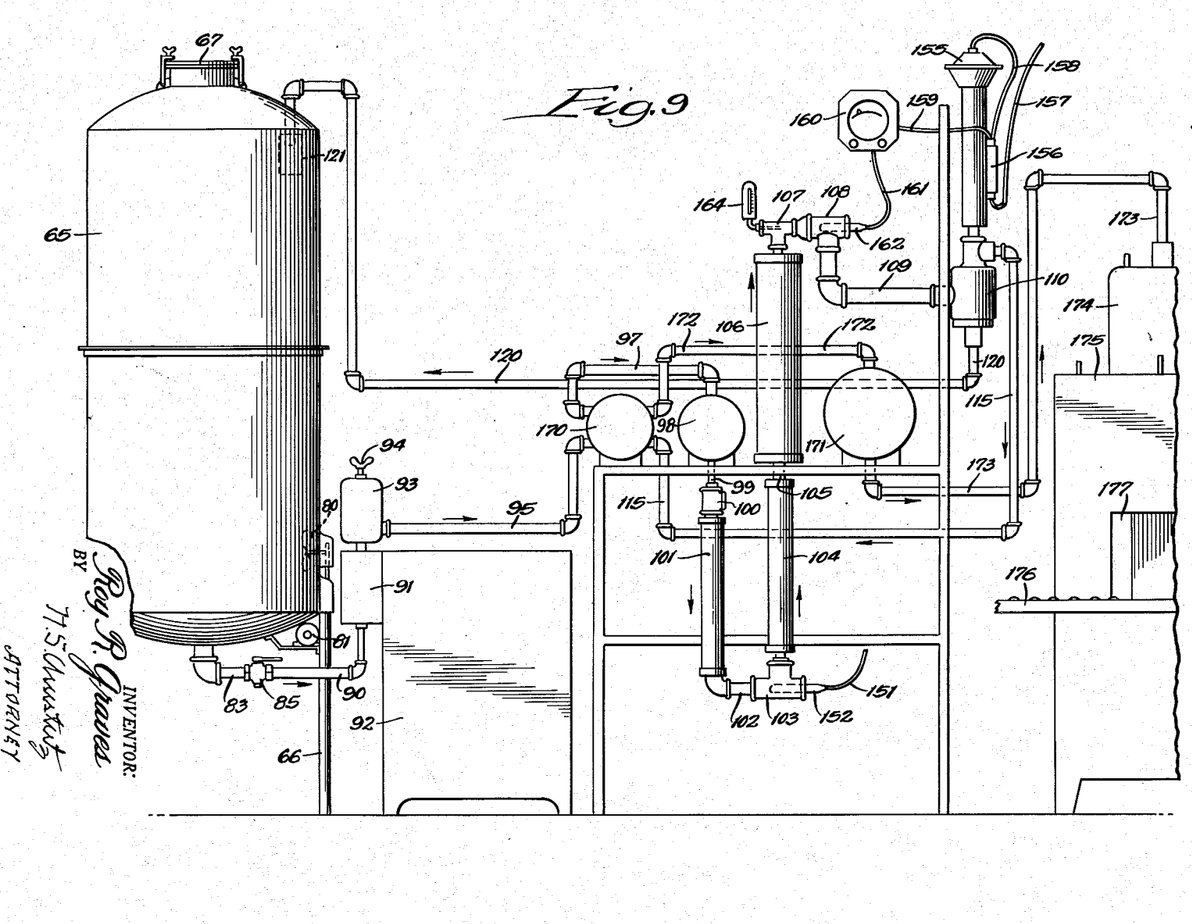
Figure 9 is a diagrammatic view similar to Fig. 2, but illustrating a different arrangement for pre-heating the homogenized milk and cooling the pasteurized milk.

The apparatus illustrated in Fig. 9 is substantially the same as that illustrated in Fig. 2 and like reference characters have been utilized for indicating like parts. The apparatus of Fig. 9 differs from that of Fig. 2 by utilizing a different type of pre-heater, cooler and packaging mechanism. The same heater or pasteurizer 98 is utilized but here the pre-heater is designated at 170 and the cooler at 171. The homogenized milk from the homogenizer 92 flows through pipe 95, through the pre-heater 170 and then through pipe 97 and the heater or pasteurizer 98 to the holding and diversion valves. The milk conduit 115 from the diversion valve 110 conveys the pasteurized milk to the pre-heater 170 for the purpose of pre-heating the raw homogenized milk and pre-cooling the pasteurized milk. The pre-cooled pasteurized milk then flows through pipe 172 through the cooler 171 and thence through pipe 173 to the milk supply chamber 174 to a canning machine 175.

The canning machine may include mechanism for maintaining the milk therein under vacuum or under a positive gas pressure of nitrogen or carbon dioxide for the purpose of keeping the milk out of contact with air. It may also provide means for conveying the cans and the lids through a tank of boiling water before entering the filling chamber, to facilitate aseptic canning. A suitable conveyor mechanism 176 may be utilized for conveying cans into and out of the canning machine through a suitable air trap 177. Thus, the homogenized, pasteurized milk may be hermetically sealed out of contact with air in cans or other suitable packages. Preferably the pasteurizing temperatures used here are relatively high in the neighborhood of 190° F. or higher to provide the super-pasteurized milk which, when canned in the absence of air and subject to sterilization temperatures will last indefinitely. The milk may be sterilized by heating the filled tins to sterilization temperatures.

The milk cooler 171 may be of the same general construction as the heater or pasteurizer 98 but instead of having steam applied thereto it will be supplied with a cooling medium such as cold brine or means for direct expansion refrigeration. It is found that to obtain the proper degree of cooling, the cooler 171 must be dimensionally larger than the pasteurizer 98.

The pre-heater 170 may be in the nature of a regenerator and may be of the type shown and described in my co-pending application Ser. No. 55,146 filed October 18, 1948. Such a pre-heater or regenerator is illustrated in Fig. 10. The regenerator comprises a tube 220 of standard external diameter and an internal tube 227. The inner tube is of the required thickness to receive external parallel spiral grooves 223 and 224. At each end of the tubular core 227, there are annular heads 228 seated in recesses formed in the ends of the tube 227. This tube is tapered on the outside from end to end and it has the spiral grooves 223, and 224 in its outer diameter that are separated by a spiral dividing wall 229. The tube 227 fits into the outer tube 220 which is reversely tapered on its inside diameter to closely fit the spiral wall 229 of the tube 227. There is an entrance to groove 223 through pipe 221 and an exit through pipe 225. The direction of flow in the groove is indicated by the arrows. An entrance to the adjacent groove 224 is through pipe 226 and the exit is through pipe 222. The very close fit between the outside diameter of the dividing walls 229 and the inside taper of the outside tube 220 is such that there is no mixing of pasteurized milk flowing in one groove with unpasteurized milk in an adjacent groove. There is sufficient length of the grooves to secure the neutralization in temperature of the two milks that are being treated; or, the complete cooling of the milk where milk is circulated in one groove and a cooling medium is circulated in the other groove in reverse direction. The heads 228 are held in place by clamps 230 which clamps are pivoted to the outer tube 220 in any desired manner.

As pointed out above the apparatus illustrated in Fig. 1 may be located at a farm for performing the first part of the method and the apparatus illustrated in Figs. 2 and 9 may be located at a processing plant for performing the second part of the method. Under these circumstances, it is necessary to transport with the least amount of handling and in the absence of air and without a material drop in temperature raw milk from the dairy farm to the processing plant and it is extremely desirable that such transfer be accomplished quickly, within three hours or so. Fig. 3 illustrates a portable tank arrangement which may be utilized for accomplishing this transfer.

The portable tank is designated at 200 and includes suitable wheels 201 and a draw bar 202 for easy transportation. The tank may be provided with a manhole 203 which is normally sealed closed. The manhole, however, may be opened for cleaning the inside of the tank. The tank is provided with an inlet pipe 204 controlled by a valve 205 for supplying milk to the tank. The pipe 204 may be provided with a suitable strainer 206 like the strainer 72 of Fig. 1. The tank may, also, be provided with a discharge pipe 207 controlled by a valve 208. The tank may, also, carry a vacuum pump 209 driven by a motor 210. The vacuum pump is connected into the tank by means of a valve 211 and may be connected to an external pipe by a valve 212. Instead of the portable tank being provided with a vacuum pump for maintaining a vacuum while enroute, the tank may be charged with an inert gas before leaving the farm. The type of portable tank shown in Fig. 3 need not be used. It could be an upright tank supported on two wheels, suitable for attaching to an automobile for conveyance to the processing plant.

In order to fill the tank, the vacuum pump is operated and the valve 211 is opened to create a vacuum within the tank 200. A connection is then made between the valve 205 and milk line 71 conveying milk from the weigh jars in the adjoining milking parlor.

If the portable tank is charged with an inert gas for conveyance to the processing plant then the vacuum pump 209—210, for creating a vacuum in the portable tank 200 as through valve 212 may be eliminated. One suitable way for introducing an inert gas would be to lead the delivery pipe from the gas cylinder to tap into sanitary line 71, so that the gas would contact the milk in route from the weigh jars to the portable tank. The warm milk would absorb some of this gas—particularly the fat globules. Fat globules would absorb 13 times as much $CO_2$ as nitrogen.

The tank may then be readily and rapidly transported to the processing plant for discharging the milk into a weigh tank and then into the tank 65 of Fig. 2. When this is done the valve 208 is suitably connected to the receiving or weigh tank at the processing plant. The portable tank is placed at the central processing plant in a position for the milk to be drawn into the vacuum weigh tank by gravity, where the weight and test of the incoming milk is secured. The weigh tank will also be under vacuum created by the vacuum pump at the processing plant. From the weigh tank the milk will be drawn into one of the storage tanks by either gravity or vacuum of a higher degree than that in the weigh tank. In any event the milk will be in the supply tank under either vacuum or inert gas so that it is not in contact with air.

Since one of the essential steps of this process is to process the milk before it is cooled it may be necessary to either insulate the portable tank or provide it with a water jacket and means for maintaining the milk at or near body temperature in transit.

In the method of canning the milk as disclosed in Fig. 9 the milk is homogenized, pasteurized at relatively high temperatures and then filled and sealed in cans either under vacuum or in an atmosphere of an inert gas. The filled cans are then subjected to a suitable temperature to bring about complete sterilization of the milk therein. Sterilization temperatures ranging from 240° to 260° F. and relatively short holding times have proven quite successful. It is found that high sterilization temperatures with short holding times result in a milk with less heated flavor.

A high sterility with the least possible heated flavor may be attained by pre-heating and pasteurizing the milk at a fairly high temperature, approximately 250°, which raises the temperature very rapidly while the milk is under great turbulence, then by promptly and rapidly again raising the temperature to approximately 290° or 300° F. followed immediately thereafter by rapidly cooling to approximately 100° F. The milk treated in this fashion may then be aseptically canned and sealed and then further cooled to about 40° to 50° F. This operation is preferably performed in a closed system without exposure to air.

Figure 11:
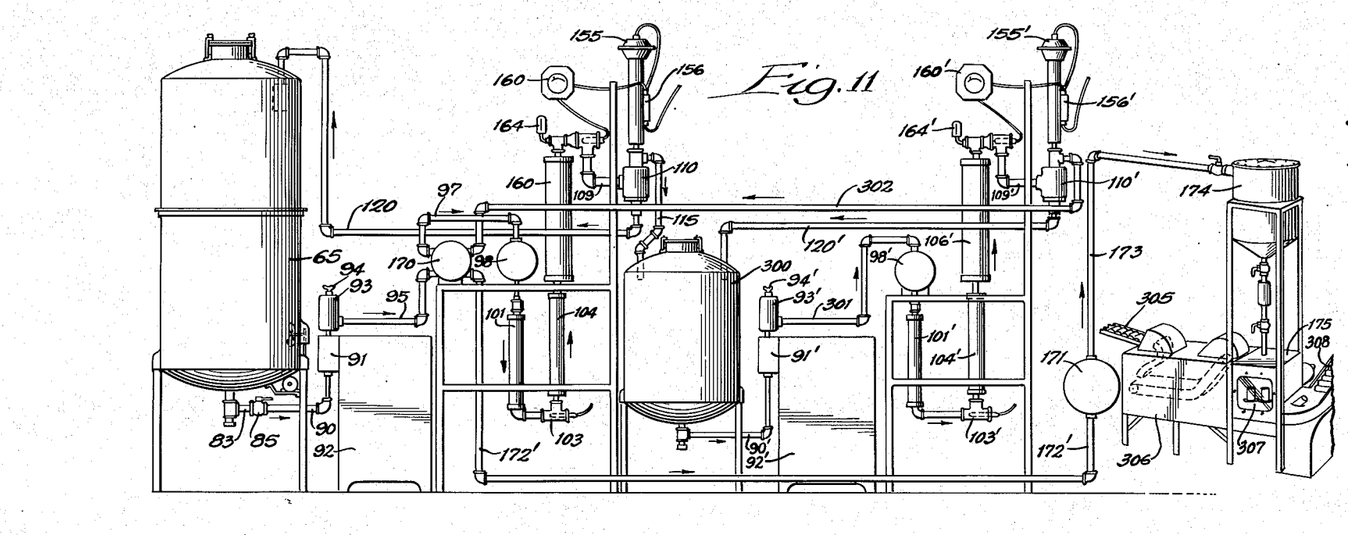
Figure 11 is a diagrammatic view similar to Fig. 9 but illustrating a different manner of pasteurizing and sterilizing the milk.

Figure 11 diagrammatically shows the manner in which this process of treating and canning the milk may be accomplished without special equipment. The arrangement of Fig. 11 corresponds generally to that of Fig. 9 and like reference characters have been utilized for like parts. In Fig. 11 the warm milk to be processed is in the tank 65 at a temperature of 90° to 95° F. and the milk is preferably blanketed with an inert gas such as nitrogen or carbon dioxide. The homogenizer 92 pulls the milk from the tank 65 and homogenizes it at approximately 2,000 lbs. per square inch and forces the milk through the pre-heater or regenerator 170 where it is heated to substantially 190° F. by the hot milk flowing in the opposite direction. The pre-heated homogenized milk then flows through the heater or pasteurizer 98, the holding valves 101, 104, 106 and into the diversion valve 110. If it is not up to the required temperature of substantially 250° F. it will be diverted back to the tank 65, but if it is up to that temperature it will go forward to an intermediate tank 300. This tank 300 is preferably smaller than the tank 65 and is under suitable pressure of an inert gas at about 30 to 40 lbs. per square inch to prevent the milk from boiling. From the tank 300 the milk is immediately withdrawn by a second homogenizer 92' or a suitable positive pressure pump having the same pumping capacity as the first homogenizer. The second homogenizer 92' forces the milk through a pipe 301 and a second heater or pasteurizer 98' to bring the milk up to the final sterilization temperature of about 290° to 300° F. The milk then passes through the holding valves 101', 104', 106' to the diversion valve 110'. If the milk is not at the desired temperature of substantially 290° to 300° F. it is diverted back to the intermediate tank 300. If it is up to that temperature the milk then passes through pipe 302 and through the heat exchanger or regenerator 170 wherein the sterilized milk is cooled and the raw homogenized milk is heated by heat exchange therein. From the regenerator 170 the partially cooled milk flows through pipe 172' to a cooler 171 where its temperature is substantially lowered to about 100° F. From the cooler 171 the sterilized milk flows through pipe 173 to the supply chamber 174 of a canning machine 175.

The milk in the supply chamber 174 is fed into cans that are filled and sealed in the chamber 307 which is under positive pressure of an inert gas. Cans and lids therefor are conveyed to the canning machine 175 by a conveyor 305 and pass through a chamber 306 where they are subjected to the sterilizing effects of boiling water or steam before they enter the filling chamber 307. In this way the sterilized milk is aseptically canned. The aseptically canned milk is then conveyed through a tank 308 of flowing cold water where the canned milk is cooled to substantially 40° to 50° F.

Thus the milk by a continuous process is homogenized, subjected to a pre-heating temperature and pasteurized, held the required few seconds in the first holding valve, subjected to the final sterilization temperature, held the required few seconds in the second holding valve, cooled continuously in two steps in the regenerator and cooler before being aseptically canned and sealed, and then finally cooled in the cans. Instead of cooling the sterilized milk before it is canned, the cans may be filled and sealed with milk while at the sterilization temperature and the cooling of the milk may be accomplished after it is sealed in the cans. If this latter method is utilized aseptic canning of the sterilized milk is not required.

There, therefore, are generally three ways of completing the canning and sterilization of the low oxygen, non-enzymatic milk of this invention, i. e., (1) by pasteurizing the milk, filling and sealing the cans with the milk and then subjecting the canned milk to the final sterilization temperatures as illustrated in Fig. 9, (2) by pasteurizing the milk, subjecting the milk to a substantially sterilizing temperature, partially cooling the sterilized milk, aseptically canning the milk and finally cooling the milk in the cans as disclosed in connection with Fig. 11 and (3) by pasteurizing theh milk, subjecting the milk to substantially sterilizing temperature, filling and sealing the cans while the milk is at the sterilizing temperature and doing the cooling after the milk is sealed in the cans, also as described in connection with Fig. 11. By methods 1 and 3 aseptic canning is not necessary though canning in an oxygen free atmosphere is required. In these two methods the cans and lids might carry some bacteria, but these would be killed by the high temperatures in raising the milk to sterilization temperature in the can or by filling the cans with milk at sterilization temperature. In the second method aseptic canning is absolutely necessary otherwise the sterilized milk may be reinfected in the canning process. The second method, however, results in less heated flavor since the heating and cooling of the milk is very rapid.

While for purposes of illustration, several forms of this invention have been disclosed, other forms thereof may become apparent to those skilled in the art upon reference to this disclosure, and therefore, this invention is to be limited only by the scope of the appended claims and prior art.

I claim:

1. The method for processing milk comprising withdrawing milk from a cow without contact with air, collecting the withdrawn raw milk without contact with air and maintaining the same substantially at body temperature, homogenizing under super-atmospheric pressure the collected raw milk without substantial prior cooling and without contact with air, and promptly and rapidly heating the homogenized milk without contact with air at least to pasteurization temperatures.

2. The method for processing milk comprising withdrawing milk from a cow without contact with air, collecting the withdrawn raw milk without contact with air and maintaining the same substantially at body temperature, homogenizing under super-atmospheric pressure the collected raw milk without substantial prior cooling and without contact with air, and promptly and rapidly heating the homogenized milk without contact with air to sterilization temperatures to sterilize the same.

3. The method for processing milk comprising withdrawing milk from a cow without contact with air, collecting the withdrawn raw milk without contact with air and maintaining the same substantially at body temperature, homogenizing under super-atmospheric pressure the collected raw milk without substantial prior cooling and without contact with air, promptly and rapidly heating the homogenized milk without contact with air at least to pasteurization temperatures to pasteurize the same, cooling the heated homogenized milk, and filling containers with the cooled homogenized milk.

4. The method for processing milk comprising withdrawing milk from a cow without contact with air, collecting the withdrawn raw milk without contact with air and maintaining the same substantially at body temperature, homogenizing under super-atmospheric pressure the collected raw milk without substantial prior cooling and without contact with air, promptly and rapidly heating the homogenized milk without contact with air to sterilization temperatures to sterilize the same, promptly, rapidly and aseptically cooling the homogenized sterilized milk without contact with air, and aseptically filling sterile containers with the cooled homogenized sterilized milk and hermetically sealing the same without contact with air.

5. The method for processing milk comprising withdrawing milk from a cow without contact with air, collecting the withdrawn raw milk without contact with air and maintaining the same substantially at body temperature, homogenizing under super-atmospheric pressure the collected raw milk without substantial prior cooling and without contact with air, promptly and rapidly heating the homogenized milk without contact with air at least to pasteurization temperatures, filling containers with the heated homogenized milk and hermetically sealing the same without contact with air, and heating the hermetically sealed containers to sterilization temperatures for sterilizing the homogenized milk therein.

6. The method for large production processing of milk obtained from a plurality of farms comprising withdrawing from each of a plurality of cows at each of a plurality of farms raw milk without contact with air, separately collecting the withdrawn raw milk from each cow in weigh jars without contact with air, collecting at each farm the withdrawn raw milk of each cow from the weigh jars of that farm in a common portable tank for each farm without contact with air and substantially at body temperature, transporting from each farm to a central processing plant in the portable tanks of each farm the collected raw milk without contact with air and substantially at body temperature, collecting at the central processing plant the raw milk from the portable tanks into storage tanks without contact with air and substantially at body temperature, withdrawing from the storage tanks and homogenizing under super-atmospheric pressure the collected raw milk without substantial prior cooling and without contact with air, and promptly and rapidly heating the homogenized milk without contact with air at least to pasteurization temperatures.

7. The method for large production processing of milk obtained from a plurality of farms comprising withdrawing from each of a plurality of cows at each of a plurality of farms raw milk without contact with air, separately collecting the withdrawn raw milk from each cow in weigh jars without contact with air, collecting at each farm the withdrawn raw milk of each cow from the weigh jars of that farm in a common portable tank for each farm without contact with air and substantially at body temperature, transporting from each farm to a central processing plant in the portable tanks of each farm the collected raw milk without contact with air and substantially at body temperature, collecting at the central processing plant the raw milk from the portable tanks into storage tanks without contact with air and substantially at body temperature, withdrawing from the storage tanks and homogenizing under super-atmospheric pressure the collected raw milk without substantial prior cooling and without contact with air, and promptly and rapidly heating the homogenized milk without contact with air to sterilization temperatures to sterilize the same.

8. The method for large production processing of milk obtained from a plurality of farms comprising withdrawing from each of a plurality of cows at each of a plurality of farms raw milk without contact with air, separately collecting the withdrawn raw milk from each cow in weigh jars without contact with air, collecting at each farm the withdrawn raw milk of each cow from the weigh jars of that farm in a common portable tank for each farm without contact with air and substantially at body temperature, transporting from each farm to a central processing plant in the portable tanks of each farm the collected raw milk without contact with air and substantially at body temperature, collecting at the central processing plant the raw milk from the portable tanks into storage tanks without contact with air and substantially at body temperature, withdrawing from the storage tanks and homogenizing under super-atmospheric pressure the collected raw milk without substantial prior cooling and without contact with air, promptly and rapidly heating the homogenized milk without contact with air to sterilization temperatures to sterilize the same, promptly, rapidly and aseptically cooling the homogenized sterilized milk without contact with air, and aseptically filling sterile containers with the cooled homogenized sterilized milk and hermetically sealing the same without contact with air.

9. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow heater for rapidly heating the homogenized raw milk at least to pasteurization temperature without contact with air, a milk connection between the homogenizer and the heater for supplying under super-atmospheric pressure homogenized milk to the heater for rapid circulation through the heater by the homogenizer, and a milk connection from the heater for the heated homogenized milk.

10. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow heater for rapidly heating the homogenized raw milk to sterilization temperatures without contact with air to sterilize the same, a milk connection between the homogenizer and the heater for supplying under super-atmospheric pressure homogenized milk to the heater for rapid circulation through the heater by the homogenizer, and a milk connection from the heater for the heated homogenized milk.

11. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow heater for rapidly heating the homogenized raw milk at least to pasteurization temperature without contact with air, a milk connection between the homogenizer and the heater for supplying under super-atmospheric pressure homogenized milk to the heater for rapid circulation through the heater by the homogenizer, an enclosed continuous flow cooler for rapidly cooling the heated homogenized milk without contact with air, a milk connection between the heater and the cooler for supplying the heated homogenized milk to the cooler for rapid circulation through the cooler by the homogenizer, a receptacle filling machine, and a milk connection between the cooler and the filling machine for supplying cooled homogenized milk to the filling machine.

12. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow heater for rapidly heating the homogenized raw milk to sterilization temperatures without contact with air to sterilize the same, a milk connection between the homogenizer and the heater for supplying under super-atmospheric pressure homogenized milk to the heater for rapid circulation through the heater by the homogenizer, an enclosed continuous flow cooler for rapidly cooling the sterilized homogenized milk without contact with air, a milk connection between the heater and the cooler for supplying the sterilized homogenized milk to the cooler for rapid circulation through the cooler by the homogenizer, an aseptic canning machine for aseptically canning the cooled sterilized homogenized milk without contact with air, and a milk connection between the cooler and the canning machine for supplying cooled sterilized homogenized milk to the canning machine for aseptic canning thereby.

13. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow heater for rapidly heating the homogenized raw milk at least to pasteurization temperature without contact with air, a milk connection between the homogenizer and the heater for supplying under super-atmospheric pressure homogenized milk to the heater for rapid circulation through the heater by the homogenizer, an enclosed continuous flow cooler for rapidly cooling the heated homogenized milk without contact with air, a milk connection including a holding valve portion between the heater and the cooler for supplying the heated homogenized milk to the cooler for rapid circulation through the cooler by the homogenizer, a receptacle filling machine, a milk connection between the cooler and the filling machine for supplying cooled homogenized milk to the filling machine, a diversion valve in the milk connection between the heater and the cooler, and control means responsive to the temperature of the heated homogenized milk in the holding valve portion of said connection containing the diversion valve for controlling the diversion valve to divert the flow of heated homogenized milk from the cooler when the temperature falls below a predetermined value.

14. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow heater for rapidly heating the homogenized raw milk to sterilization temperatures without contact with air to sterilize the same, a milk connection between the homogenizer and the heater for supplying under super-atmospheric pressure homogenized milk to the heater for rapid circulation through the heater by the homogenizer, an enclosed continuous flow cooler for rapidly cooling the sterilized homogenized milk without contact with air, a milk connection including a holding valve portion between the heater and the cooler for supplying the sterilized homogenized milk to the cooler for rapid circulation through the cooler by the homogenizer, an aseptic canning machine for aseptically canning the cooled sterilized homogenized milk without contact with air, a milk connection between the cooler and the canning machine for supplying cooled sterilized homogenized milk to the canning machine for aseptic canning thereby, a diversion valve in the milk connection between the heater and the cooler, and control means responsive to the temperature of the heated homogenized milk in the holding valve portion of said connection containing the diversion valve for controlling the diversion valve to divert the flow of heated homogenized milk from the cooler when the temperature falls below a predetermined value.

15. A milk processing apparatus for processing raw milk which has not been contacted by air nor subjected to substantial prior cooling comprising an enclosed tank containing said raw milk out of contact with air, a homogenizer for homogenizing said raw milk under super-atmospheric pressure without contact with air, a milk connection between the tank and the homogenizer for supplying said raw milk to the homogenizer, an enclosed continuous flow preheater for rapidly preheating the homogenized milk without contact with air, a milk connection between the homogenizer and the preheater for supplying under super-atmospheric pressure homogenized milk to the preheater for rapid circulation therethrough by the homogenizer, an enclosed continuous flow heater for rapidly heating the preheated homogenized milk at least to pasteurization temperatures without contact with air, a milk connection between the preheater and the heater for supplying under super-atmospheric pressure preheated homogenized milk to the heater for rapid circulation therethrough by the homogenizer, and a milk connection from the heater for the heated homogenized milk.

16. The method for processing raw milk which has not been contacted by air nor subjected to substantial prior cooling comprising homogenizing under super-atmospheric pressure said raw milk without substantial cooling and without contact with air, and promptly and rapidly heating the homogenized milk without contact with air at least to pasteurization temperatures.

17. The method for processing raw milk which has not been contacted by air nor subjected to substantial prior cooling comprising homogenizing under super-atmospheric pressure said raw milk without substantial cooling and without contact with air, and promptly and rapidly heating the homogenized milk without contact with air to sterilization temperatures to sterilize the same.

18. The method for processing raw milk which has not been contacted by air nor subjected to substantial prior cooling comprising homogenizing under super-atmospheric pressure said raw milk without substantial cooling and without contact with air, promptly and rapidly heating the homogenized milk without contact with air at least to pasteurization temperatures to pasteurize the same, cooling the heated homogenized milk, and filling containers with the cooled homogenized milk.

19. The method for processing raw milk which has not been contacted by air nor subjected to substantial prior cooling comprising homogenizing under super-atmospheric pressure said raw milk without substantial cooling and without contact with air, promptly and rapidly heating the homogenized milk without contact with air to sterilization temperatures to sterilize the same, promptly, rapidly and aseptically cooling the homogenized sterilized milk without contact with air, and aseptically filling sterile containers with the cooled homogenized sterilized milk and hermetically sealing the same without contact with air.

20. The method for processing raw milk which has not been contacted by air nor subjected to substantial prior cooling comprising homogenizing under super-atmospheric pressure said raw milk without substantial cooling and without contact with air, promptly and rapidly heating the homogenized milk without contact with air at least to pasteurization temperatures, filling containers with the heated homogenized milk and hermetically sealing the same without contact with air, and heating the hermetically sealed containers to sterilization temperatures for sterilizing the homogenized milk therein.

ROY R. GRAVES.

REFERENCES CITED

The following references are of record in the file of this patent:

UNITED STATES PATENTS

| Number | Name | Date |
|---|---|---|
| 1,798,413 | Graves | Mar. 31, 1931 |
| 1,825,645 | Martin, Jr. | Sept. 29, 1931 |
| 1,883,420 | Stephens | Oct. 18, 1932 |
| 1,977,511 | Graves | Oct. 16, 1934 |
| 2,130,645 | Horneman | Sept. 30, 1938 |
| 2,170,196 | Grindrod | Aug. 22, 1939 |
| 2,226,946 | Russel | Dec. 31, 1940 |
| 2,239,397 | North et al. | Apr. 22, 1941 |
| 2,425,901 | Thomas | Aug. 19, 1947 |
| 2,522,796 | Olson et al. | Sept. 19, 1950 |